United States Patent [19]

Peterson et al.

[11] Patent Number: 5,320,397

[45] Date of Patent: Jun. 14, 1994

[54] MULTIPLE PANEL TAILGATE FOR A UTILITY VEHICLE

[75] Inventors: Francis C. Peterson, Prescott, Wis.; Leo F. Wildgen, Bloomington, Minn.

[73] Assignee: Phillips Plastics Corporation, Prescott, Wis.

[21] Appl. No.: 971,284

[22] Filed: Nov. 4, 1992

[51] Int. Cl.⁵ .............................. B62D 33/08
[52] U.S. Cl. ........................ 296/57.1; 296/180.1
[58] Field of Search ............. 296/50, 57.1, 26, 180.1

[56] References Cited

U.S. PATENT DOCUMENTS

| | | | |
|---|---|---|---|
| 4,472,639 | 9/1984 | Bianchi | 296/26 |
| 4,475,759 | 10/1984 | Wine | 296/1 S |
| 4,585,265 | 4/1986 | Mader | 296/1 S |
| 4,652,035 | 3/1987 | Austin, Jr. | 296/1 S |
| 4,778,213 | 10/1988 | Palmer | 296/26 |
| 4,884,838 | 12/1989 | Slater | 296/180.1 |
| 4,902,066 | 2/1990 | Norman | 296/180.1 |
| 5,133,584 | 7/1992 | McCleary | 296/61 |
| 5,156,432 | 10/1992 | McCleary | 296/57.1 X |

FOREIGN PATENT DOCUMENTS 459395 1/1937 United Kingdom .

*Primary Examiner*—Robert R. Song
*Attorney, Agent, or Firm*—Merchant, Gould, Smith, Edell, Welter & Schmidt

[57] ABSTRACT

A multiple panel tailgate having panels which may be unfolded to cover a portion of the pick-up truck cargo bed. The multiple panels may be nested for storage in the primary tailgate panel.

3 Claims, 4 Drawing Sheets

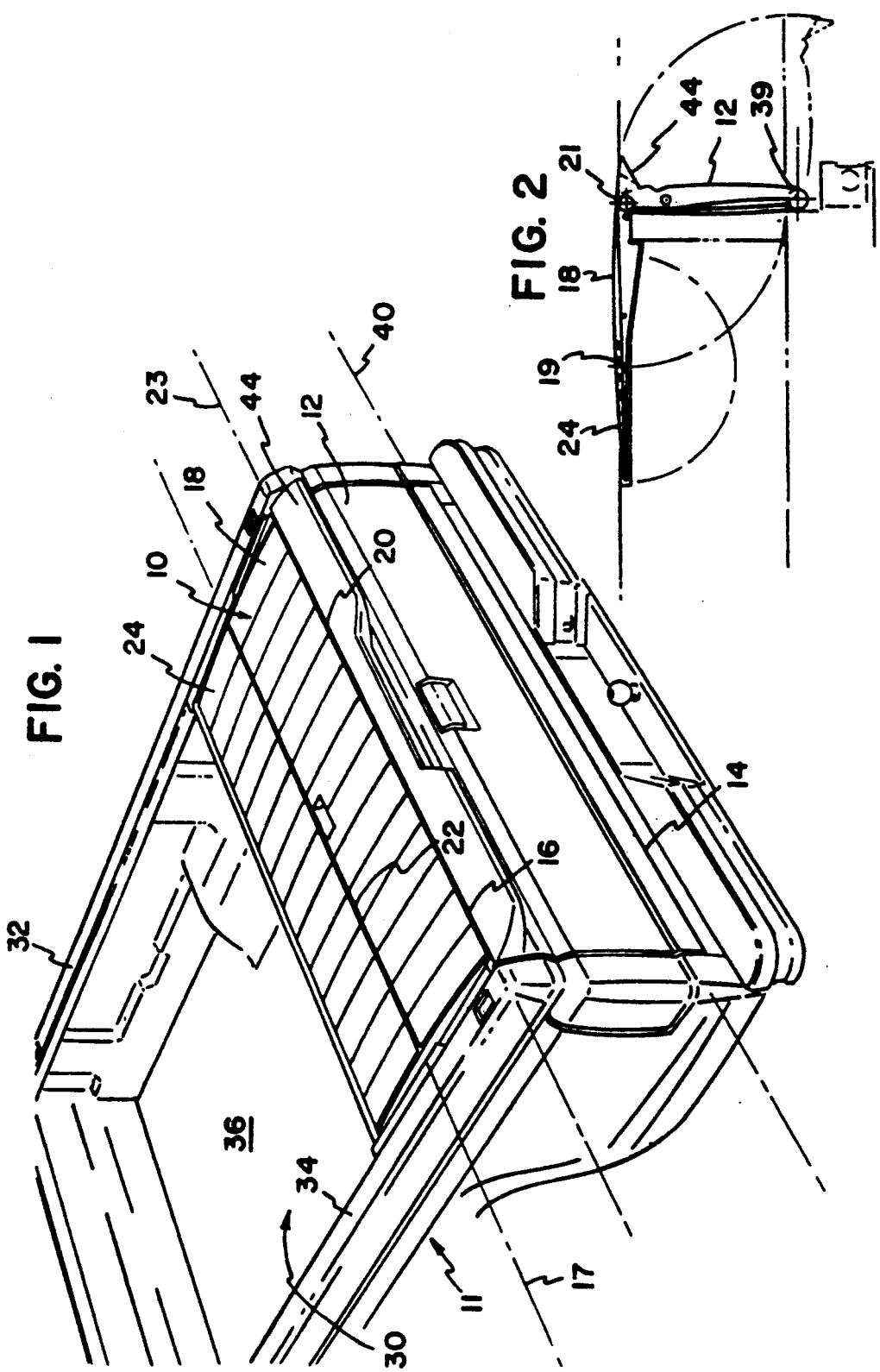

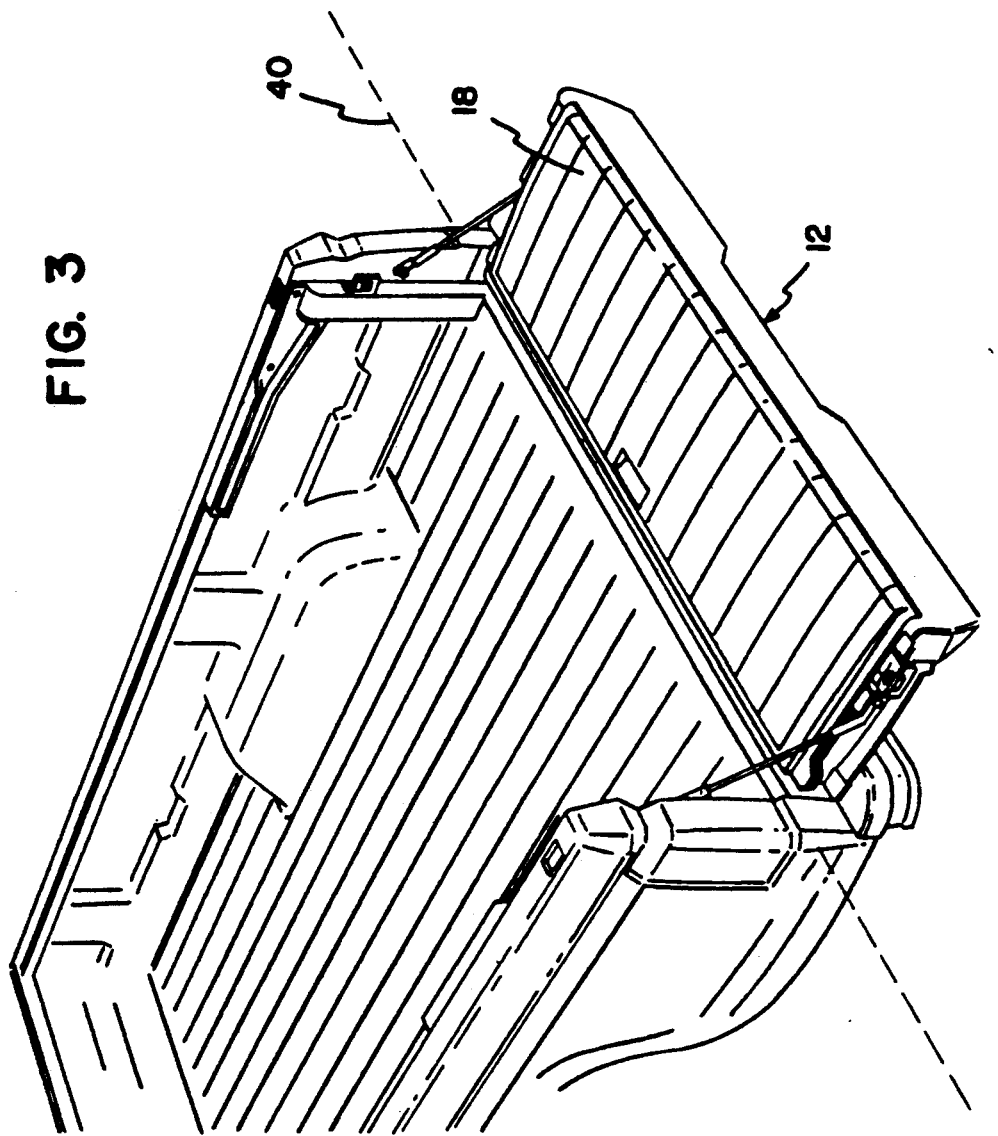

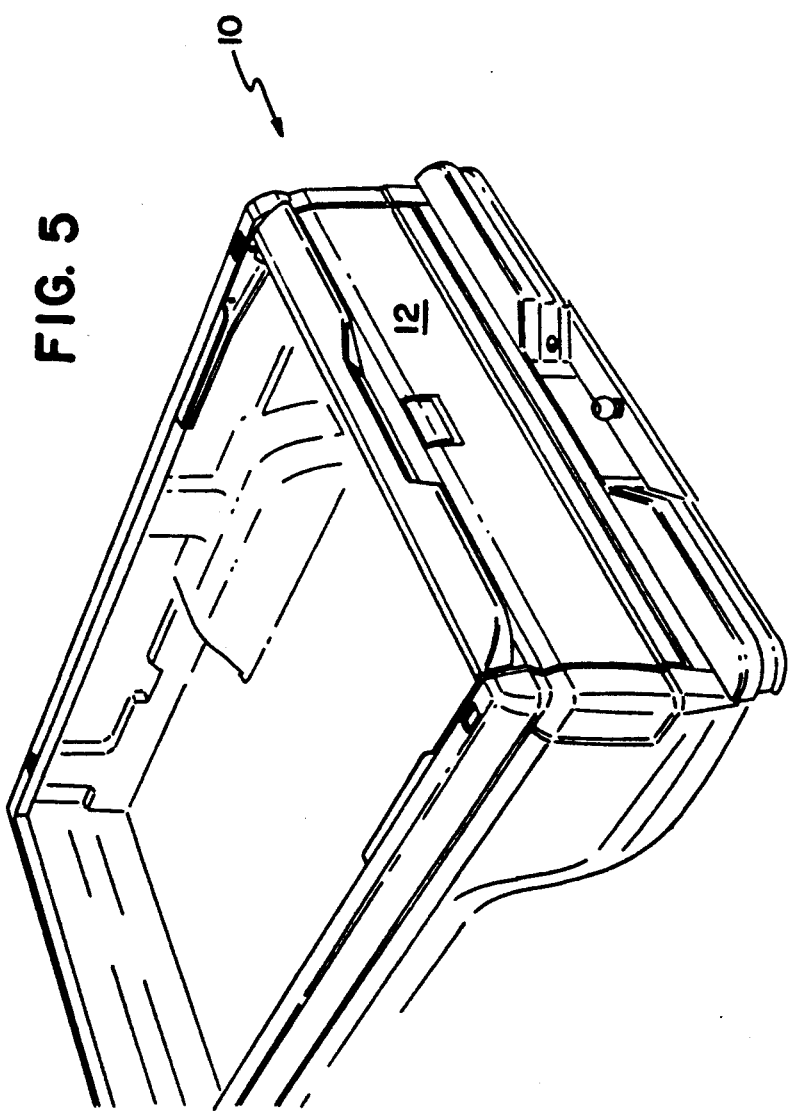

MULTIPLE PANEL TAILGATE FOR A UTILITY VEHICLE

CROSS-REFERENCE TO RELATED APPLICATIONS

The present invention is directed to the same technical problem addressed by copending application Ser. No. 07/888,188 filed May 26, 1992 commonly owned with the present invention.

TECHNICAL FIELD

The invention relates to an aerodynamic tailgate for use with a pick-up truck or other open cargo bed utility vehicle.

BACKGROUND ART

The traditional tailgate which closes off the cargo bed of a pick-up truck causes significant aerodynamic drag in its vertical or "closed" position. To reduce drag many users completely remove the tailgate or drive with the tailgate in its horizontal or "open" position. Multiple position tailgates have also been proposed to improve aerodynamic efficiency. See for example:

U.S. Pat. No. 4,585,265 to Mader which teaches a linkage which permits the traditional tailgate to be mounted in a horizontal position over the bed of the cargo area.

U.S. Pat. No. 4,475,759 Wine teaches a pair of brackets to permit remounting of the tailgate in a generally horizontal position between the sides of the pick-up truck cargo area.

U.S. Pat. No. 4,902,066 to Norman teaches a louvered tailgate which improves the aerodynamics of the pick-up truck in comparison to a conventional tailgate.

U.K. Patent specification 459,395 (1937) to Benson Motor Body Company, which teaches a flap which may be hinged at the "bottom" forming a pick-up truck like tailgate, or hinged at the "top" permitting it to lie in a horizontal plane over the bed.

DISCLOSURE OF INVENTION

The tailgate of the present invention includes three nested panels which may be unfolded to cover a portion of the pick-up truck cargo box. When unfolded and extended to cover the pick-up truck cargo bed, the tailgate assembly reduces the aerodynamic drag of the pick-up truck. With the multiple panels fully folded in the nested position the tailgate assembly may be moved between a horizontal "open" position for loading cargo and a vertical "closed" position.

The tailgate assembly preferably comprises three panels. A primary tailgate panel is hinged to the lower edge of the pick-up truck cargo box. A secondary gate panel is hinged to the top of the primary gate panel. A tertiary gate panel is hinged to the secondary gate panel. The secondary gate panel can be nested or folded into the primary gate panel, while the tertiary gate panel can be nested or folded into the secondary gate panel.

In one mode of operation, the primary, secondary and tertiary gate panels are nested and latched together. In this configuration the tailgate assembly can be raised into the vertical or closed position to emulate a conventional tailgate. With the primary gate panel released and secondary and tertiary panels rotated out of the nested position, the secondary and tertiary gate panels may be positioned generally horizontal above the bed, across the sides of the pick-up cargo area, in an aerodynamically efficient position. In this position the secondary and tertiary gate panels engage panel brackets which retain the secondary gate panel and tertiary gate panel in position. These panel brackets also the angular orientation of the secondary and tertiary gate panels with respect to the floor of the bed.

It is preferred to include a primary panel extension or "overhang" which projects rearward from the top edge of the primary panel when the primary gate panel is in the vertical or closed position.

BRIEF DESCRIPTION OF THE DRAWING

An illustrative example of the invention is presented in the several figures of the drawing where identical reference numerals refer to identical structure throughout:

FIG. 1 is perspective view of the tailgate assembly in the unfolded position.

FIG. 2 is cross-section view of the tailgate assembly in the unfolded position.

FIG. 3 is a perspective view showing the tailgate assembly in the open position.

FIG. 5 is a perspective view showing the tailgate assembly in the closed position.

MODE FOR CARRYING OUT THE INVENTION

Figure 4:
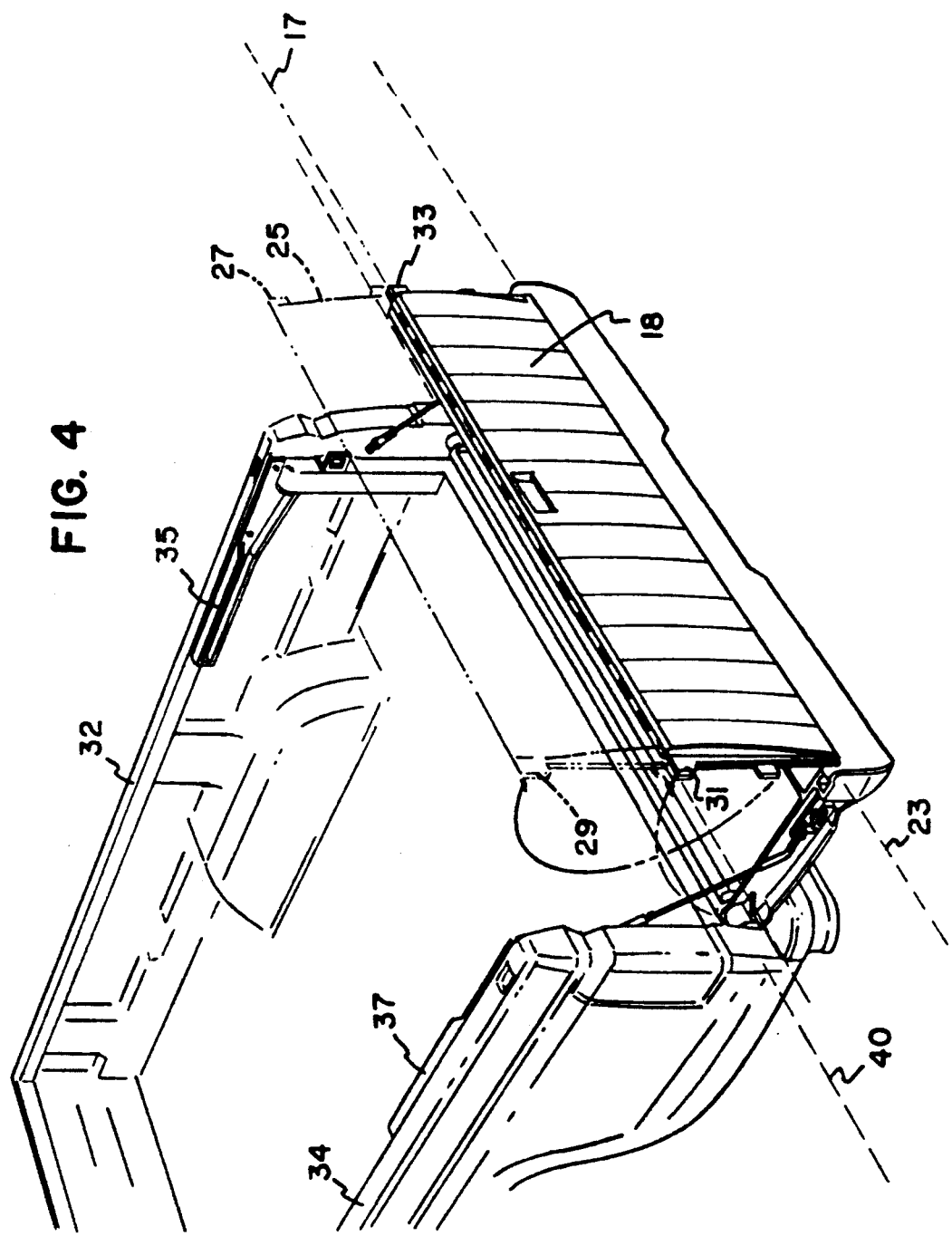
FIG. 4 is a perspective view showing the tailgate assembly in an intermediate position.

FIG. 1 shows the tailgate assembly 10 mounted on a pick-up truck 11. In this figure the tailgate assembly 10 is shown in the unfolded position partially covering the pick-up truck cargo box 30. The pick-up truck cargo box 30 is defined in part by first cargo box side wall 32, second cargo box side wall 34 and cargo box floor 36. The tailgate assembly 10 has a primary gate panel 12 which is hinged to a secondary gate panel 18, which is in turn hinged to a tertiary gate panel 24. In this unfolded position the secondary gate panel 18 and the tertiary gate panel 24 are both in a generally horizontal position over the cargo box 30, parallel to the cargo box floor 36.

In this configuration the rear area formed by the intersection of the sidewalls 32, 34 with the floor 36 is blocked by the primary gate panel 12. The secondary gate panel 18 and tertiary gate panel 24 cover approximately the rear third of the cargo box 30. It is preferred to include an overhang 44 on the primary gate panel substantially orthogonal to the primary gate panel 12 to extend a approximately four inches beyond the primary gate panel 12 toward the rear of the pick-up truck 11. This overhang 44 is located at the top of the primary gate panel and provides a significant reduction in aerodynamic drag. This overhang also stiffens the primary gate panel.

The primary, gate panel 12 has both a lower edge 14 and an upper edge 16. The primary gate panel lower edge 14 is coupled to the floor 36 of the cargo box 30 with a hinge 39 (FIG. 2) along a first hinge axis 40. The secondary gate panel 18 has a secondary gate panel first edge 20 and a secondary gate panel second edge 22. A hinge 21 (FIG. 2) defines a second hinge axis 23, and connects the secondary gate panel first edge 20 to the primary gate panel upper edge 16. The tertiary gate panel 24 has a tertiary gate panel first edge 26 which abuts the secondary gate panel second edge 22. A third hinge 19 (FIG. 2) is provided to connect the tertiary gate panel 24 to the secondary gate panel 18.

FIG. 2 is cross-section view of the tailgate assembly in the unfolded position depicting the location of the preferred hinge mechanisms for connecting the panels. This figure shows the direction of rotation of the several panels. For example the primary gate panel 12 may be rotated about hinge 39 over a range of approximately 90 degrees. The tertiary gate panel 24 can rotate about third hinge 19 through about 180 degrees. The secondary gate panel 18 can rotate about hinge 21 through approximately 90 degrees.

FIG. 3 depicts the tailgate assembly 10 in the open position where the primary gate panel 12 has been rotated about axis 40 though approximate ninety degrees. In this open position the cargo box 30 is accessible. In this view the secondary gate panel 18 and tertiary gate panels are fully nested into the primary gate panel 12 and present a generally horizontal cargo loading area.

FIG. 4 depicts the tailgate assembly 10 in an intermediate position showing how the panels may be manipulated into the unfolded position. First, the primary gate panel 12 is rotated about first hinge axis 40 to bring the tailgate assembly into the open position. Next, the secondary gate panel 18 is released and is rotated about the second hinge axis 23. In this intermediary position the tertiary gate panel 24 may be exposed and rotated about the third hinge axis 17 into the phantom position 25. Once the tertiary gate panel 24 is partially elevated the tailgate assembly 10 may be moved into the unfolded position set forth in FIG. 1.

Any of a variety of techniques may be used to retain the tailgate assembly in the unfolded position including the preferred tabs shown in FIG. 4 as tertiary gate panel retaining tab 27 and tertiary gate panel retaining tab 29, and secondary gate panel retraining tab 31 and secondary gate panel retraining tab 33. These tabs enter the first side wall slot 35 and the second side wall slot 37. When the primary gate panel is closed and latched to the side walls the tabs are trapped in the slots.

FIG. 5 is a perspective view showing the tailgate assembly 10 in the closed position. In this position the multiple panel tailgate has the several panels nested together and it mimics the normal action of a conventional tailgate in the closed position where the cargo area is closed off.

We claim:

1. A tailgate assembly 10 for use with a utility vehicle of the type having a cargo box 30 of the type having a first side wall 32 and a second side wall 34, and a bed floor 36, said tailgate assembly 10 comprising:
   a primary gate panel 12 hinged 39 to said bed floor 36, said primary gate panel 12 having a first edge 16 and having a second edge 14;
   a secondary gate panel 18 hinged 21 to said primary gate panel 12 along said primary gate panel first edge 16, said secondary gate panel having a first edge 20 and a second edge 22;
   a tertiary gate panel 24 connected to a third hinge 19 which is connected to said secondary gate panel 18 along said second edge 22;
   whereby said secondary gate panel 18 and said tertiary gate panel 24 can be moved into a position wherein said box 30 is partially covered by said secondary gate panel 18 and said tertiary gate panel 24 by positioning said secondary gate panel 18 and said tertiary gate panel 24 parallel to said bed floor 36.

2. The tailgate assembly 10 of claim 1 further comprising:
   an overhang 44 coupled to said primary gate panel 12 proximate said first edge 16 of said primary gate panel 12, and which projects toward the rear from said primary gate panel 12 when said primary gate panel 12 is in said closed position.

3. The tailgate assembly 10 of claim 1 further comprising:
   a first sidewall slot 35 located on said first cargo box sidewall 32;
   a second sidewall slot 37 located on said second cargo box sidewall 34;
   retaining tab means (27,29,31,33) for cooperative engagement with said first sidewall slot 35 and said second sidewall slot 37 and for retaining said secondary gate panel 18 and said tertiary gate panel 24 in a substantially horizontal position over said cargo box floor 36.

* * * * *

UNITED STATES PATENT AND TRADEMARK OFFICE
CERTIFICATE OF CORRECTION

PATENT NO. : 5,320,397

DATED : June 14, 1994

INVENTOR(S) : Francis C. Peterson et al

It is certified that error appears in the above-identified patent and that said Letters Patent is hereby corrected as shown below:

```
In column 1, line 29, before the word "Wine"
please insert the word --to--

In column 2, line 5, after the word "also", please
insert the word --retain--

In column 2, line 51, please delete "a" after the word
"extend"

In column 3, line 3, before the word "cross-section",
please insert --a--

In column 3, line 15, before the word "approxminate",
please delete the word "though" and insert the word
--through--
```

Signed and Sealed this

Eleventh Day of October, 1994

*Attest:*

BRUCE LEHMAN

*Attesting Officer*

*Commissioner of Patents and Trademarks*